United States Patent
Badri et al.

(10) Patent No.: US 9,885,797 B2
(45) Date of Patent: Feb. 6, 2018

(54) MONITORING MATRIX ACIDIZING OPERATIONS

(71) Applicant: SCHLUMBERGER TECHNOLOGY CORPORATION, Sugar Land, TX (US)

(72) Inventors: Mohammed Badri, Al-Khobar (SA); Reza Taherian, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 150 days.

(21) Appl. No.: 14/550,037

(22) Filed: Nov. 21, 2014

(65) Prior Publication Data

US 2016/0146964 A1 May 26, 2016

(51) Int. Cl.
| | |
|---|---|
| G01V 1/30 | (2006.01) |
| E21B 47/00 | (2012.01) |
| G01V 1/50 | (2006.01) |
| E21B 43/28 | (2006.01) |

(52) U.S. Cl.
CPC .............. *G01V 1/50* (2013.01); *E21B 43/28* (2013.01); *E21B 47/0006* (2013.01)

(58) Field of Classification Search
CPC ... G01V 1/50; G01V 3/20; G01V 1/44; G01V 1/40; E21B 43/28; E21B 47/0006; E21B 43/26; E21B 49/00; E21B 43/25
USPC .......................................................... 367/35
See application file for complete search history.

(56) References Cited

U.S. PATENT DOCUMENTS

| | | | | |
|---|---|---|---|---|
| 3,248,938 A | * | 5/1966 | Hill | E21B 47/10 417/63 |
| 5,979,557 A | * | 11/1999 | Card | C09K 8/68 166/281 |
| 6,196,318 B1 | | 3/2001 | Gong et al. | |
| 7,603,261 B2 | | 10/2009 | Tardy | |
| 7,953,587 B2 | * | 5/2011 | Bratton | E21B 43/00 703/10 |
| 2003/0225521 A1 | | 12/2003 | Panga et al. | |
| 2008/0099198 A1 | | 5/2008 | Debrit et al. | |

(Continued)

OTHER PUBLICATIONS

International Search Report for corresponding PCT Application No. PCT/US2015/060374 dated Feb. 5, 2016, 3 pp.

*Primary Examiner* — Daniel L Murphy (57) ABSTRACT

An acoustic logging tool is disposed in a wellbore during an acidizing operation. Measurements are made using the acoustic logging tool on a region of a formation penetrated by the wellbore and being subjected to the acidizing operation. An acoustic anisotropic property of the formation is inferred at one or more depths of investigation within the region using the measurements, and a wormhole porosity and/or an orientation of one or more wormholes resulting from the acidizing operation is determined. Acidizing operation management decisions may be made based on the determined wormhole porosity and/or orientations of the wormholes. An acidizing operation management decision may be to maintain, increase, or decrease an acid injection rate. Measurements made may include the velocity of an acoustic wave propagating through the formation and the acoustic anisotropic properties of fast waves and slow waves. The acoustic anisotropic properties of the formation generally depend on rock stiffness.

16 Claims, 4 Drawing Sheets

(56) References Cited

U.S. PATENT DOCUMENTS

2011/0139441 A1* 6/2011 Zolezzi Garreton ... E21B 28/00
                                                    166/249
2014/0212006 A1  7/2014 Zhao et al.

* cited by examiner

MONITORING MATRIX ACIDIZING OPERATIONS

BACKGROUND OF THE DISCLOSURE

Well logging provides a detailed record (through a well log) of the geologic formations (e.g., carbonate rock) penetrated by a borehole. It has been extensively used as a mapping technique for exploring and characterizing the subsurface and evaluating the hydrocarbon production potential of a reservoir, along with the identification of other properties of the formation. Well logging provides useful measurements that may be used to extract information about the rock formation related to, for example, porosity, lithology, potential presence of hydrocarbons, and pore-filling fluids. Measurement techniques are based on at least three broad physical aspects: electrical, acoustic (which includes sonic), and nuclear.

The first logging technique measured the electrical conductivity of a formation and used electrodes. The original induction electrical logging tool had a transmitter (magnetic dipole) and a receiver. The magnetic field from the transmitting dipole induced ground loop currents in the surrounding formation that gave rise to an alternating magnetic field that was sensitive to the formation conductivity. The induced alternating magnetic field was detected by the receiver and the conductivity of the formation through which the signal had passed could be determined. For instance, a reservoir formation filled with hydrocarbon could be recognized on a typical electrical log since it was more resistive than the salt water that was commonly found in deeply buried reservoir rocks. The first well log dates back to 1927, performed in the Pechelbronn field in Alsace, France. Since that time, research and engineering efforts have improved this technology to accommodate harsh well conditions and to investigate complex reservoir properties.

An acoustic or sonic logging tool transmits a sound pulse into the formation that is subsequently detected by a receiver. The speed at which the sound (i.e., acoustic wave) propagates through the formation depends at least in part on the formation's mineral composition and porosity. The measured travel time allows one to determine a sonic velocity that can be used to determine the porosity via the well-known Wyllie time-average relation.

Another logging tool designed for formation evaluation uses Gamma rays and neutrons to characterize the geological formation. The absorption of Gamma radiation is proportional to the density of the formation, while that of neutrons is proportional to the amount of hydrogen present. Gamma ray and neutron logs can be indicative of the porosity distribution.

Production logging tools include a variety of sensors that are used to identify the nature and behavior of fluids in or around the borehole during production. They provide useful information such as temperature, flow rates, and fluid capacitance/impedance. Surveys may be performed during production operations to evaluate the dynamic well performance (i.e., the productivity of different zones) and to diagnose possible well problems.

Logging while drilling (LWD) tools allow for detailed formation evaluation as the well is drilled. This allows one to maximize the reservoir value. LWD tool logs allow drilling engineers to make appropriate decisions for particular realized drilling circumstances and optimally direct the direction of the drill. Different measurements are available using LWD technology and their selection depends on the complexity associated with the mineralogy, texture, and open fractures within a target zone near the wellbore. The measurements tools may include Gamma ray tools, electrical resistivity propagation tools, acoustic/sonic logging tools, neutron porosity tools, and nuclear magnetic resonance (NMR) tools.

Acidization is used extensively in well stimulation operations to increase the permeability of carbonate rocks, thus facilitating the flow of oil to the wellbore. As acid is injected into the porous medium (carbonate rock), highly-permeable channels or "wormholes" are formed by the dissolution of carbonate material. A successful matrix treatment produces thin, but deep wormholes with a minimal amount of injected acid.

SUMMARY

An acoustic logging tool is disposed in a wellbore during an acidizing operation. Measurements are made using the acoustic logging tool on a region of a formation penetrated by the wellbore and being subjected to the acidizing operation. An acoustic anisotropic property of the formation is inferred at one or more depths of investigation within the region using the measurements, and a wormhole porosity and/or an orientation of one or more wormholes resulting from the acidizing operation is determined. Acidizing operation management decisions may be made based on the determined wormhole porosity and/or orientations of the wormholes. An acidizing operation management decision may be to maintain, increase, or decrease an acid injection rate. Measurements made may include the velocity of an acoustic wave propagating through the formation and the acoustic anisotropic properties of fast waves and slow waves. The acoustic anisotropic properties of the formation generally depend on rock stiffness.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to determine the wormhole porosity (i.e., total wormhole area per unit area of wellbore wall (or formation) or total wormhole volume per unit volume of formation) and/or orientation of wormholes resulting from matrix acidizing or acidization is disclosed. The definition above for "wormhole porosity" encompasses at least three measurement scenarios: (1) fractional area of a relevant portion of borehole wall; (2) fractional area of a relevant formation slice; and (3) fractional volume of a relevant formation volume. Matrix acidizing facilitates oil flow from a formation to a drainage or production wellbore. Reservoir management decisions may be based on in-situ, real-time measurements of a reservoir formation (e.g., carbonate rock) undergoing acidization. In the embodiments described herein we specifically refer to carbonate rocks as the acidized formation, but other rock types may be treated in the same manner or in a similar manner adapted for a particular rock type.

Acoustic logging tools may be used for real-time monitoring and control of wormhole formation and propagation. Carbonates and certain other types of rocks may vary in terms of their heterogeneity and thus a prediction of the optimal operating conditions (e.g., injection rate, type of acid, diversion agents, etc.) for acidizing a specific area undergoing exploitation is a challenging task. Disposing a logging tool into the wellbore to obtain real-time measurements (e.g., a series of well logs covering the depth range of expected wormholes) while the formation is undergoing acidization may provide useful, real-time guidance to a reservoir manager. That is, changes and trends of variations of those measurements can be interpreted to track the penetration of wormholes and to detect areas in which the acidization may not be progressing in accordance with plan.

Acoustic measurements may yield insight into the type of acidizing regimen to use and to estimate the depth and speed of wormhole penetration. Real-time acoustic (or sonic) measurements may allow one to predict the optimal operating conditions for creating production-enhancing wormholes. In particular, acoustic anisotropy may be used to determine the wormhole porosity of the wormholes, in a zone away from the well, and also the dominant orientation of a wormhole.

In one embodiment, a sonic logging tool has an acoustic transmitter for generating acoustic pulses and at least one receiver for detecting received waves. (While a sonic tool is sometimes restricted to acoustic waves in the range of 1 to 25 kHz, the tool is not limited to those frequencies herein, instead we will use "acoustic" and "sonic" interchangeably, as they often are, to include the full range of detectable acoustic waves.) The tool is disposed in a borehole, thereby measuring the velocity of acoustic wave propagation in the formation, which can then be related to the formation acoustic anisotropy.

Modern acoustic logging tools are able to measure acoustic anisotropy. The acoustic anisotropy is routinely used to estimate fracture orientation, for example. Acoustic anisotropy is determined by noting that most, if not all, rocks are acoustically anisotropic at some scale. That is, at some level, their acoustic properties are not the same in all directions. Variation of acoustic properties is due, at least in part, to the rock stiffness being orientation dependent. For example, when a shear wave (S-wave) travels through a rock sample, the particles in a plane parallel to the direction of propagation are moved by the acoustic energy. The extent of this movement in an anisotropic formation is controlled by how stiff one direction is relative to the other. The stiffer direction leads to faster wave propagation compared to a direction perpendicular to it. The acoustic properties of the fast and slow waves can be measured and used to calculate the anisotropy.

Stiffness is a property of the material, but it can be modified by perturbations. Factors such as stress, presence of bed boundaries, presence of fractures, compaction direction, compaction depth, etc. can affect the stiffness. For example, a rock formation under downhole conditions often exhibits a direction of maximum stress and a perpendicular direction in which there is minimum stress. Those stress directions are controlled either by the dominant regional tectonics or by local perturbations such as drilling operations. The stresses are one of the causes of acoustic anisotropy. In addition, there are many cases in which there are fractures, either natural or drilling induced, that contribute to acoustic anisotropy, independent of the stress. In a real rock, most of the perturbations mentioned above are present at the same time. The net result of their being present is an acoustic anisotropy direction that is the resultant of those factors.

Figure 1A:
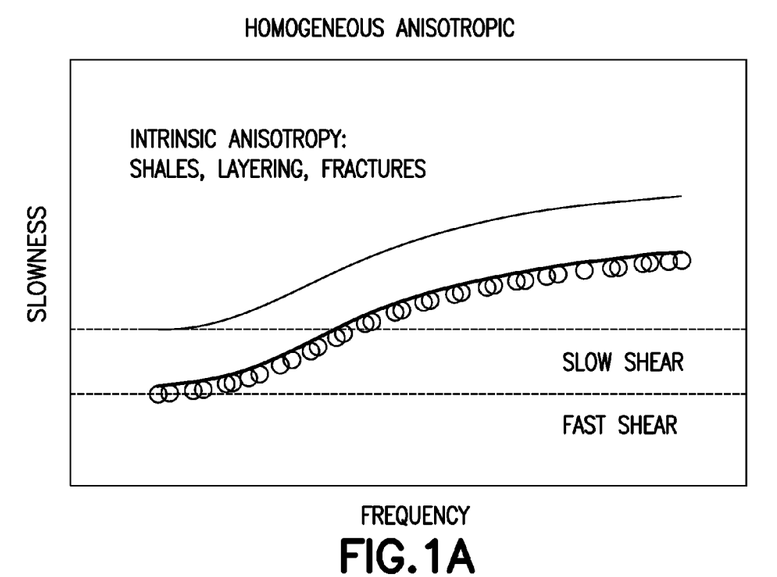
FIGS. 1A and 1B are plots of acoustic slowness as functions of frequency for anisotropic homogeneous and anisotropic inhomogeneous formations, respectively, in accordance with the present disclosure.

The plotted circles in FIG. 1A show the frequency dependence of fast shear for rocks that are anisotropic but homogeneous. The lower and upper curves, respectively, show the fast shear slowness and the slow shear slowness as functions of frequency. In the homogeneous rock, the fast shear slowness and the slow shear slowness curves are parallel to one another. Their ratio, which is the anisotropy, is therefore frequency independent. Rocks that are fractured tend to behave as shown in the plot of FIG. 1A.

Figure 1B:
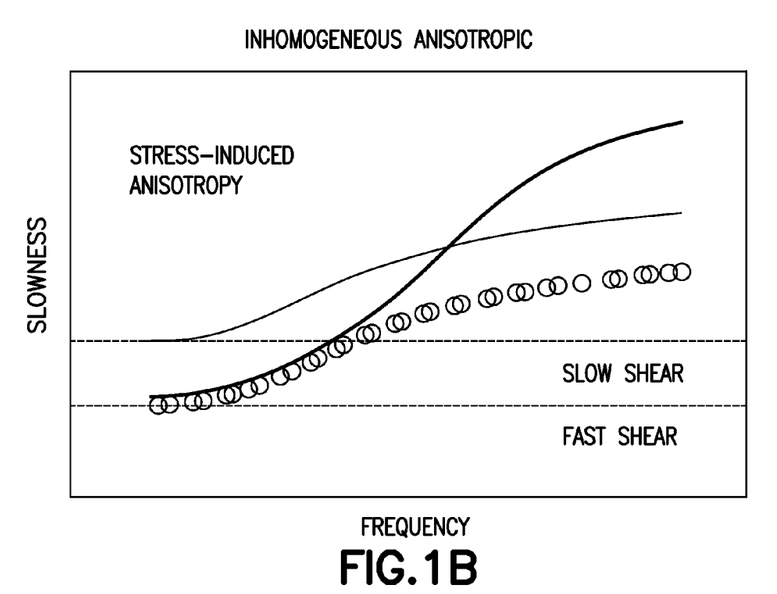

FIG. 1B shows similar curves, but for an anisotropic, inhomogeneous rock formation. In this case, the two shear slowness curves cross. The slow shear slowness is initially greater than the fast shear slowness, but eventually their relative magnitudes reverse. Because the curves are not parallel, the anisotropy (i.e., ratio of slow shear and fast shear slowness) is frequency dependent. Analysis of the sonic slowness as a function of frequency (i.e., a dispersion analysis) provides information on both the magnitude and the depth of the anisotropy. Rocks that have stress-induced anisotropy tend to exhibit this behaviour.

Figure 2:
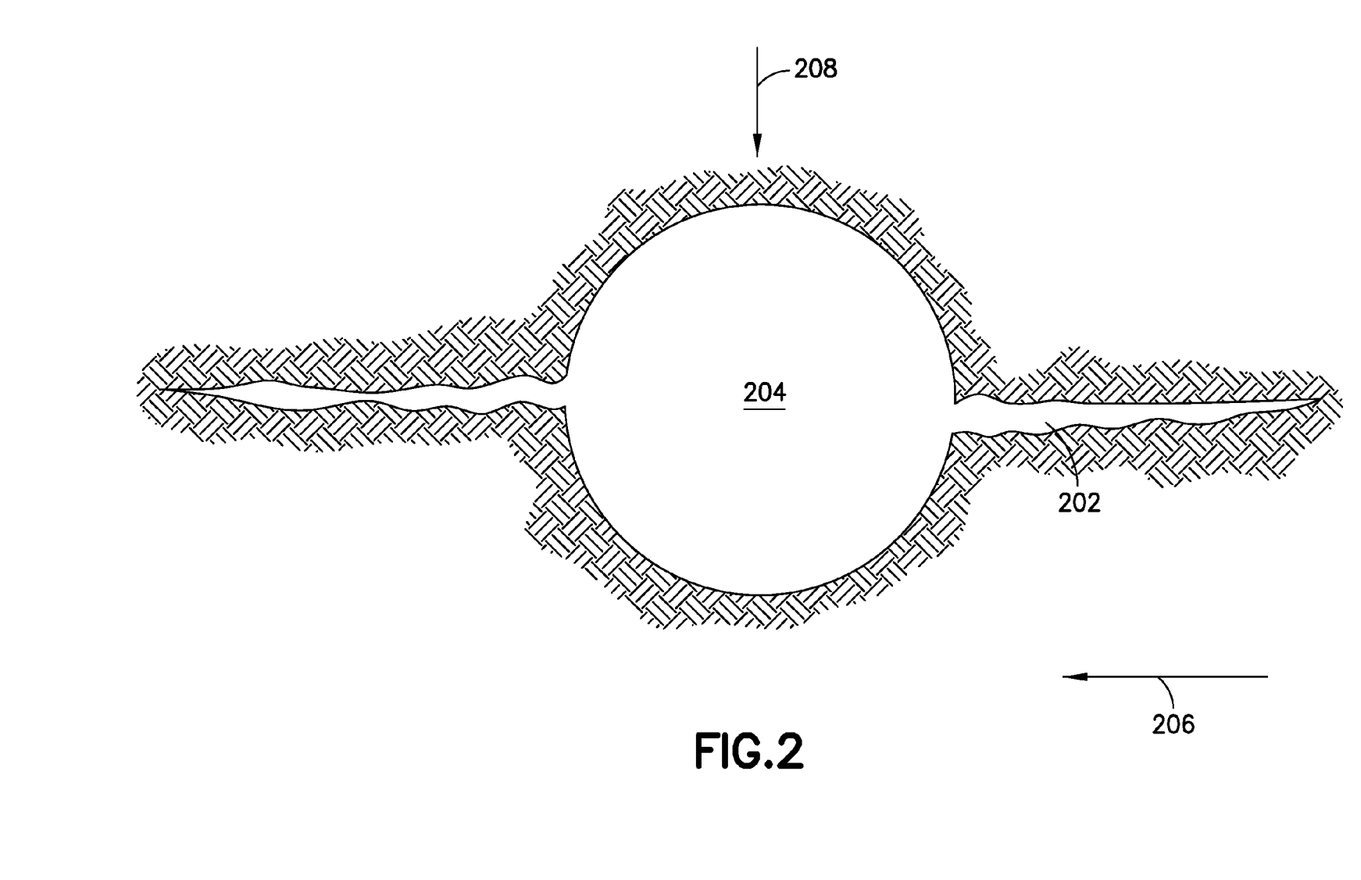
FIG. 2 schematically shows a plan view of fractures or wormholes intersecting a borehole, in accordance with the present disclosure.

When acid is injected into a borehole, in the absence of any anisotropies the entire borehole wall tends to dissolve, causing the borehole diameter to increase. However, when perturbations or stresses are present, any penetration of acid in the direction of minimum stress is counteracted by the maximum stress which acts to close the newly formed opening. The acting force is proportional to the maximum stress. Any acid penetration in the maximum stress direction encounters a similar closing tendency by a counteracting force that is proportional to the minimum stress. As a result (i.e., the closing force proportional to the minimum stress being less than the closing force proportional to the maximum stress), the wormhole is expected to propagate preferentially in a direction parallel to the maximum stress direction. These arguments are equally valid when a fracture is being induced in the formation. Thus, both the wormhole preferred direction and the fracture dominant (strike) direction are controlled by the interplay between the maximum and minimum stress directions. FIG. 2 schematically shows a plan view of the fractures or wormholes 202 intersecting a borehole 204. The maximum 206 and minimum 208 stress directions are indicated by arrows.

Figure 3A:
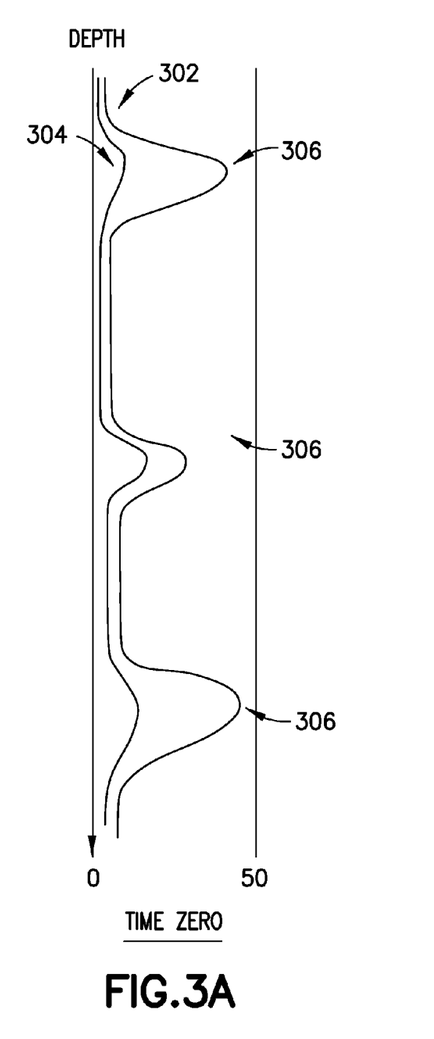
FIGS. 3A and 3B schematically show a set of logs recorded over the same depth interval at different times, in accordance with the present disclosure.
Figure 3B:
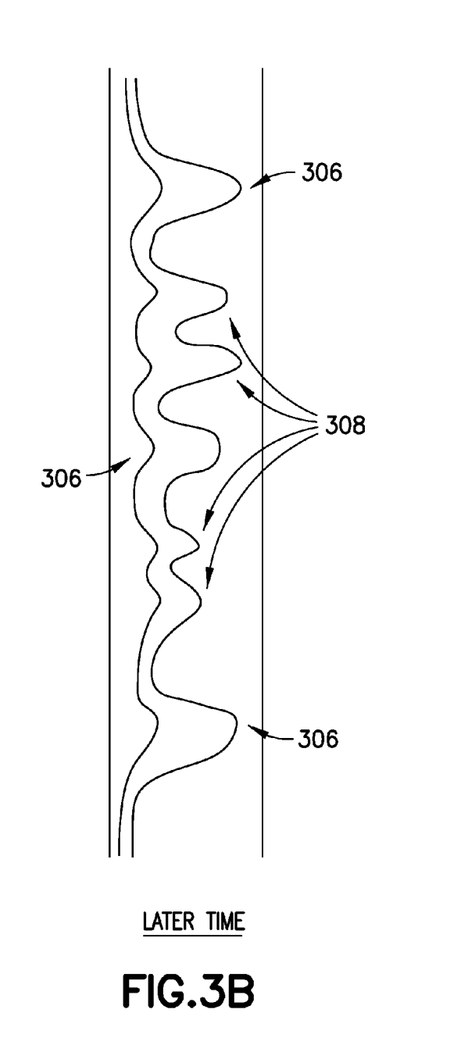

In practice, three different acoustic anisotropies are determined and used (though others are possible): the slowness, the travel time, and the energy anisotropies. Of these, the energy anisotropy is generally the more robust. In log format (see FIGS. 3A and 3B), the maximum energy 302 and the minimum energy 304 are plotted. The gap between them is a measure of the anisotropy. FIGS. 3A and 3B show, as an example, a set of logs recorded over the same depth interval at different times. At time t=0 (FIG. 3A), before acid is injected, the log shows high anisotropy at three different depths. Those can be attributed to fractures 306 since they were present before acid injection. Various intermediate or subsequent logs (i.e., logs run at different times—not all shown individually herein) may be run. A log run at a later time (FIG. 3B), with acid already injected and acidization in progress, may show enhanced levels of anisotropy at the depths where the fractures 306 were located. In addition, new indications of anisotropy 308 may be observed at other depths that are related to anisotropy caused by the acidization process (e.g., wormholes).

Figure 4:
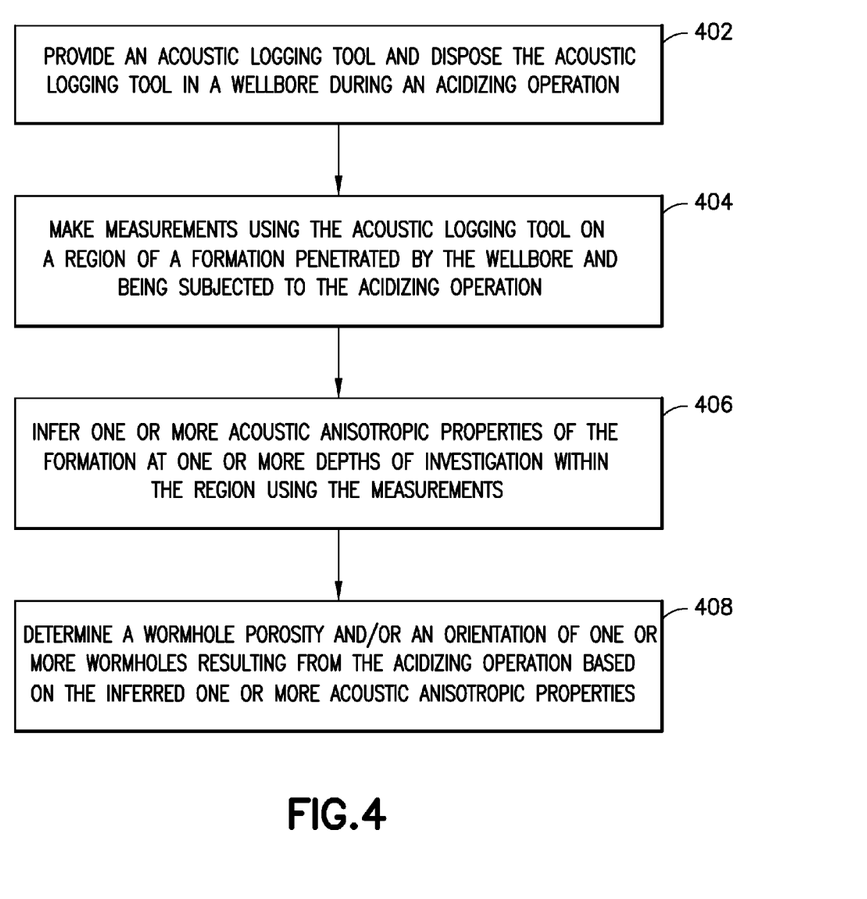
FIG. 4 is a flowchart for monitoring a matrix acidization treatment while pumping acid, in accordance with the present disclosure.

FIG. 4 is a flowchart for one embodiment to determine the wormhole porosity and/or orientation of wormholes resulting from matrix acidizing or acidization. An acoustic logging tool is provided and disposed in a wellbore during an acidizing operation (402). Measurements are made using the acoustic logging tool on a region of a formation penetrated by the wellbore and being subjected to the acidizing operation (404). One or more acoustic anisotropic properties of the formation at one or more depths of investigation within the region are inferred using the measurements (406). A wormhole porosity and/or an orientation of one or more wormholes resulting from the acidizing operation is determined (408).

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments described above particularly pertain to the oil and gas industry, this disclosure also contemplates and includes potential applications such as $CO_2$ storage, underground water detection, geology, monitoring of water content (e.g., landfill leak), environmental spill monitoring, and wherever a long-term monitoring tool for water- or oil-bearing material is required.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
   providing an acoustic logging tool and disposing the acoustic logging tool in a wellbore during an acidizing operation;
   making a plurality of measurements at different time intervals using the acoustic logging tool on a region of a formation penetrated by the wellbore and being subjected to the acidizing operation while acidizing is in progress;
   inferring one or more acoustic anisotropic properties of the formation at one or more depths of investigation within the region using the measurements; and
   determining a wormhole orientation of one or more wormholes resulting from the acidizing operation based on the inferred one or more acoustic anisotropic properties wherein the wormhole orientation is controlled by an interplay between a determined maximum and minimum stress direction in the formation.

2. The method of claim 1, wherein the making a plurality of measurements includes making in situ, real-time measurements.

3. The method of claim 1, wherein the making a plurality of measurements includes measuring a velocity of acoustic wave propagation through the formation.

4. The method of claim 3, wherein the inferring one or more acoustic anisotropic properties uses the measured velocity of acoustic wave propagation.

5. The method of claim 1, wherein the making a plurality of measurements includes measuring the acoustic anisotropic properties of fast waves and slow waves.

6. The method of claim 1, wherein the inferred one or more acoustic anisotropic properties of the formation depend on a rock stiffness.

7. The method of claim 6, wherein the rock stiffness is affected by presence of stress in the rock, presence of bed boundaries, presence of fractures, a compaction direction, and/or a compaction depth.

8. The method of claim 7, wherein the presence of stress or the presence of fractures is naturally occurring, induced, or both.

9. The method of claim 1, further comprising:
   determining a preferred fracture or wormhole direction based on the determined maximum stress direction and the minimum stress direction in the formation.

10. The method of claim 1, further comprising:
    distinguishing between formations having fractures and formations having stress-induced anisotropy based on the frequency dependence of the one or more inferred acoustic anisotropic properties.

11. The method of claim 1, wherein the inferred acoustic anisotropic properties are selected from the group consisting of: slowness anisotropy, travel time anisotropy, and energy anisotropy.

12. The method of claim 1, wherein the method further comprises the step of maintaining an acid injection rate; increasing the acid injection rate; or decreasing the acid injection rate based on the determined wormhole orientation.

13. A system, comprising:
    an acoustic logging tool disposed in a wellbore during an acidizing operation; and
    a processor located at the earth's surface or carried on the acoustic logging tool capable of:
    making a plurality of measurements at different time intervals using the acoustic logging tool on a region of a formation penetrated by the wellbore and being subjected to the acidizing operation while acidizing is in progress;
    inferring one or more acoustic anisotropic properties of the formation at one or more depths of investigation within the region using the measurements; and
    determining a wormhole orientation of one or more wormholes resulting from the acidizing operation based on the inferred one or more acoustic anisotropic properties wherein the wormhole orientation is controlled by an interplay between a maximum and minimum stress direction in the formation.

14. The method of claim 13, wherein the processor is further capable of maintaining an acid injection rate; increasing an acid injection rate; or decreasing an acid injection rate based on the determined wormhole orientation.

15. A non-transitory, computer-readable storage medium, which has stored therein one or more programs, the one or more programs comprising instructions, which when executed by a processor, cause the processor to perform a method comprising:
- making a plurality of measurements at different time intervals using an acoustic logging tool on a region of a formation penetrated by a wellbore and being subjected to an acidizing operation while acidizing is in progress;
- inferring one or more acoustic anisotropic properties of the formation at one or more depths of investigation within the region using the measurements; and
- determining a wormhole orientation of one or more wormholes resulting from the acidizing operation based on the inferred one or more acoustic anisotropic properties wherein the wormhole orientation is controlled by an interplay between a maximum and minimum stress direction in the formation.

16. The method of claim 15, wherein the method further comprises the step of maintaining an acid injection rate; increasing an acid injection rate; or decreasing an acid injection rate based on the determined wormhole orientation.

* * * * *